United States Patent [19]
Rickhoff, Jr.

[11] 3,709,140
[45] Jan. 9, 1973

[54] BARBECUE PIT

[75] Inventor: Leo J. Rickhoff, Jr., St. Louis, Mo.

[73] Assignee: Tennessee Jed's Franchise Corp., St. Louis, Mo.

[22] Filed: Jan. 22, 1971

[21] Appl. No.: 108,746

[52] U.S. Cl. ......................99/331, 99/486, 99/483
[51] Int. Cl. ................................................A23b 1/04
[58] Field of Search........99/259, 260, 261, 262, 327, 99/328, 331; 126/41, 59.5

[56] References Cited

UNITED STATES PATENTS

| | | | |
|---|---|---|---|
| 928,900 | 7/1909 | Brand | 99/259 X |
| 2,649,149 | 8/1953 | Mayer | 126/41 X |
| 2,667,157 | 1/1954 | Vastola | 126/59.5 |
| 2,790,380 | 4/1957 | Shryack | 99/261 |
| 3,348,472 | 10/1967 | Anetsberger et al. | 126/41 X |
| 3,524,403 | 8/1970 | Treloar | 99/331 |
| 3,586,518 | 6/1971 | Folmar | 99/259 |

Primary Examiner—Robert W. Jenkins
Assistant Examiner—Arthur O. Henderson
Attorney—Cohn & Powell

[57] ABSTRACT

This barbecue pit includes a firebox having a pit portion housing gas burner units; log grates; and a flame quenching system. The gas burner units, which include drip protecting guards, provide the primary cooking heat source and are located below the log grates and sufficiently close to the logs to ensure that they will smolder and impart smoke flavoring to the cooking products. The quenching system which allows smoldering of the logs without excessive flame-up may be operated semi-automatically by a push button or fully automatically by a flame sensitive element.

8 Claims, 5 Drawing Figures

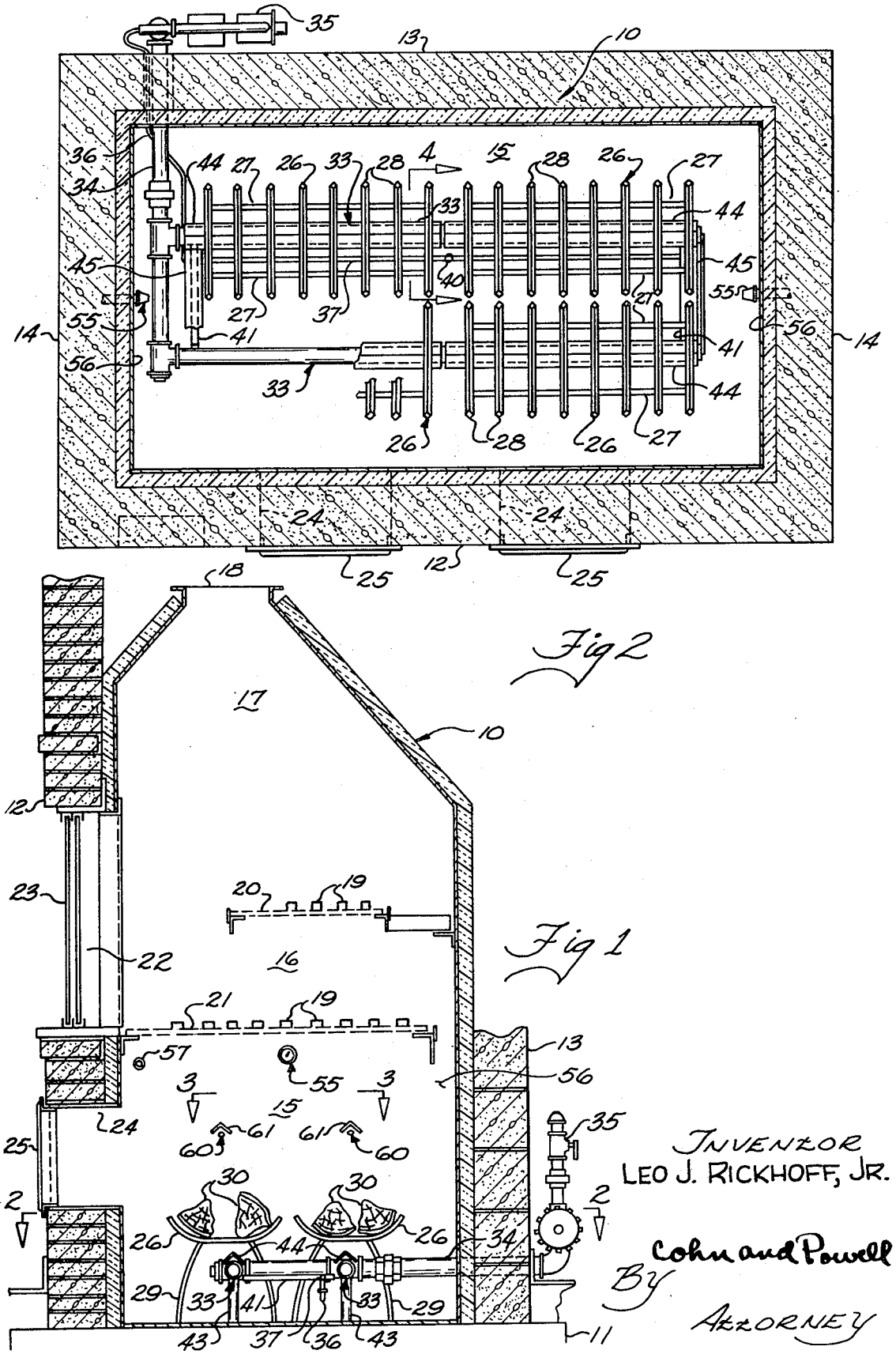

PATENTED JAN 9 1973

INVENTOR
LEO J. RICKHOFF, JR.

Cohn and Powell
BY
ATTORNEY

BARBECUE PIT

BACKGROUND OF THE INVENTION

This invention relates in general to barbecue pits and in particular to a barbecue pit incorporating a controlled heat system.

Restaurants which provide barbecue-type cooking are increasingly popular in the United States even though the indoor adaptation of what was originally an outdoor form of cooking presents many problems. It is particularly difficult to control the cooking heat in the large, indoor units, which must of necessity be used in commercial establishments. And yet without such control, the cooking process cannot be accomplished in a sufficiently efficient manner to render the undertaking profitable. Obviously, the cost of providing additional labor is not an adequate solution and the use of at least partially automatic controls is desirable.

It is well-known that the smoldering of hickory logs or chips underneath meat and the like imparts a smoked flavor to the meat. However, the desirable amount of smoke flavoring coupled with the necessary degree of heat required for cooking is not easy to achieve. Typically in barbecue cooking, it is necessary from time to time to quench the burning logs when flame-ups occur from the dripping of grease onto the logs. Such quenching is considerably more difficult to control with a large barbecue unit than with a smaller, domestic unit.

The use of gas burners rather than logs provides a cooking heat source which is much more easy to control either manually or automatically. Gas cooking, however, presents certain drawbacks. For example, the desirable feature of hickory flavoring cannot be achieved with a gas flame alone. Moreover, flame-ups resulting from grease dripping and the necessity for quenching also provide problems since both grease and water tend to inhibit successful gas burning. The barbecue pit described herein overcomes these various disadvantages.

SUMMARY OF THE INVENTION

This barbecue pit combines the convenience and advantage of controlled gas heating with the desirable smoked flavoring, imparted by smoldering hickory logs to meats and the like during the cooking process, without sacrificing the quality of the cooked product.

A quenching system which may be manually, semi-automatically or fully automatically controlled enhances the efficiency of the cooking process and provides a desirable safety feature. Gas burners are used as a primary heat source and are provided with guards to preclude interference, by grease drippings from the cooking products and water from the quenching system, with the gas burning process. The barbecue pit is relatively simple to manufacture, efficient in operation and inexpensive to maintain.

The barbecue pit includes a firebox having a pit portion disposed below a cooking shelf and housing a support frame carrying smoke flavoring solids such as hickory logs. Elongate gas burners are disposed below the support frame and sufficiently close to the logs to ensure that they are ignited so as to smolder and produce smoke and to provide a secondary heat source. Flame quenching spray units are provided within the pit portion of the firebox, which are automatically or semi-automatically controlled from outside of the barbecue pit.

The support frame for the smoke flavoring logs is provided by log grates disposed in side-by-side relation and mounted above associated gas burners.

Each gas burner includes a plurality of rows of side openings and the openings are protected from grease drippings and quenching water by guard plates disposed above the burners. The guards are removably mounted on the gas burners by outwardly projecting brackets spaced along the length of each burner.

The flame quenching system includes a pair of spray nozzles mounted to opposite side walls between the level of the cooking shelf and the level of the grate. A solenoid water valve controls flow to the spray nozzles and the solenoid is electrically actuated by means of a push button or by means of a flame sensitive element housed within the pit portion of the barbecue. A time delay relay, which is actuated by the flame sensitive element provides that discharge through the water valve will not occur unless the flame-up is of significant intensity and duration.

BRIEF DESCRIPTION OF THE DRAWINGS

FIG. 1 is a cross sectional view through the barbecue pit;

FIG. 2 is a fragmentary sectional plan view taken on line 2—2 of FIG. 1 and illustrating the gas burner and grate arrangement;

DESCRIPTION OF THE PREFERRED EMBODIMENT

Figure 5:
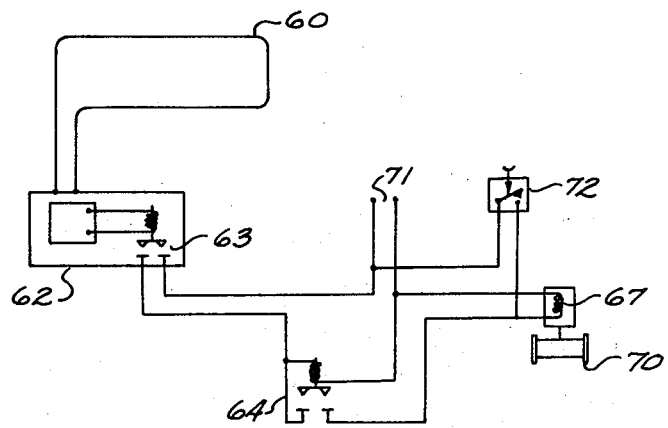
FIG. 5 is a schematic representation of the electrical circuitry controlling the quenching system.
Figure 3:
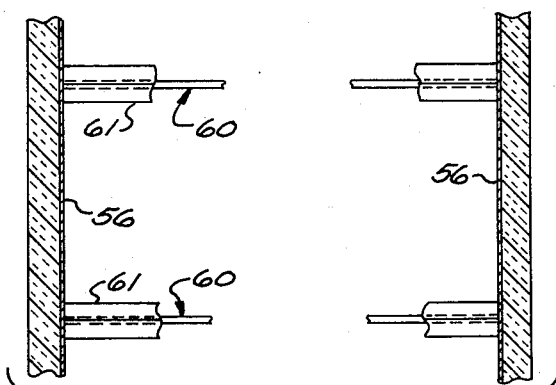
FIG. 3 is a fragmentary plan view taken on line 3—3 of FIG. 1 and illustrating the flame sensing element and guard.

Referring now by characters of reference to the drawings and first to FIGS. 1 and 2, it will be understood that the barbecue pit comprises a lined and insulated firebox, generally indicated by numeral 10, mounted on a base 11, and enclosed by front and rear masonry or concrete walls 12 and 13, and side walls 14.

The firebox 10 is lined throughout with sheet metal and is insulated by rigid fiberglass or similar insulating material and includes a pit portion 15, an intermediate portion 16, and a hood portion 17. The hood portion 17 is of inverted hopper construction and terminates in a flue opening 18 at its upper end, leading to a conventional flue (not shown).

In the preferred embodiment, the cooking products, generally indicated by numeral 19, are carried by upper and lower shelves 20 and 21. Shelf 20 is disposed within the firebox intermediate portion 16. Shelf 21 is disposed immediately above the firebox pit portion 15 which is thereby defined in part by said shelf 21. Shelf 21 is also disposed adjacently of an access opening 22, which is fitted with conventional glass sliding doors 23, and which extends through the front wall 12. A pair of clean-out openings 24, provided with clean-out door 25, afford access to the pit portion 15.

Log grates 26, four in number in the preferred embodiment, are housed within the pit portion 15. Each of said log grates 26 includes a pair of longitudinal members 27 interconnected by a plurality of transverse members 28 and supported on legs 29. The log grates 26 of wrought iron or other heat resistant metal provide support means for hickory logs, generally indicated by numeral 30, and constituting smoke-flavoring solids.

An elongate gas burner tube 33 is disposed below each aligned pair of log grates 26. The burner tubes 33 are disposed below the log grates 26 in ignition proximity to the logs 30 to provide substantially continuous smoldering of said logs. In effect, the burners 33 and the logs 30 provide primary and secondary sources of cooking heat respectively.

Figure 4:
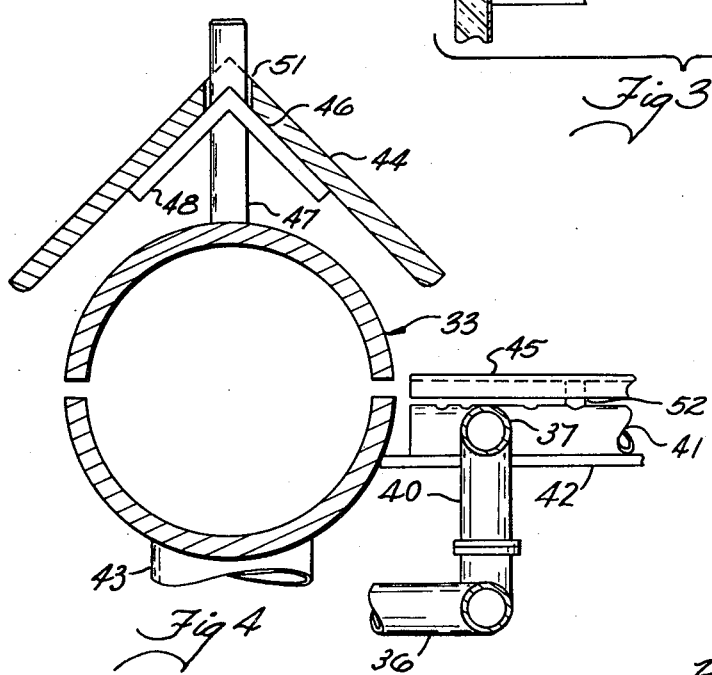
FIG. 4 is an enlarged detail of a gas burner and guard taken on line 4—4 of FIG. 2.

The burner assembly, of which the gas burner tubes 33 form a part, is shown in FIG. 2 and an enlarged detail of a gas burner tube and pilot tube is shown in FIG. 4. The gas burner tubes 33 are supplied at one end from a supply line 34 which is connected to a control unit, generally shown by numeral 35. A pilot supply tube 36, connected at one end to the control unit 35, leads to an elongate pilot manifold 37. The pilot supply tube 36 is connected to the manifold 37 at the manifold midpoint 40. A pair of transverse pilot burner tubes 41 located at the ends of the gas burner tubes 33, are supplied by the manifold 37 and each pilot burner tube 41 is supported on a cross brace 42, welded or otherwise connected between the gas burner tubes 33, as shown in FIG. 4. Each of the gas burner tubes 33 is supported by a plurality of feet 43 extending between tube 33 and base 11.

In order to protect the gas burner tubes 33 and the pilot burner tubes 41 from grease drippings from the cooking shelf 21, each of said burners is provided with a drip shield constituting a guard. The drip shields for the main burners 33 are provided by elongate angles 44 and those for the pilot burners 41 by elongate bent plates 45. The angle drip shields 44 are supported by means of brackets 46 formed from outwardly projecting studs 47 having relatively short seating angles 48 welded thereto. The angle drip shields 44 include slots 51 receiving the upper portions of the studs 47 and this arrangement permits the guards to be removable for cleaning. It will be understood that brackets 46 are provided to support each end of each angle drip shield 44. The pilot burner bent plate drip shields 45 are considerably smaller than the main burner angle drip shields 44 and are mounted above the pilot burner tubes 41 by means of end studs 52 welded to said tubes 41.

The flow of gas from the gas burner tubes 33 is controlled thermostatically by temperature sensing elements 57, shown in FIG. 1, which project outwardly from each side wall 56 and this arrangement is similar to that used to control the gas supply to a conventional furnace. Although it is a relatively simple matter to control the flow of gas from the burner tubes 33 thermostatically and hence control the heat from these burner tubes, the control of flame-up from the logs, resulting from grease drippings, for example, it more difficult because such flame-ups are by their very nature random and unpredictable. In order to render such flame-ups harmless and to control them so that they do not burn the product being prepared, the firebox 10 is provided with a flame quenching system. The firebox quenching system may be actuated either automatically or semi-automatically as desired and includes a pair of oppositely disposed spray nozzles 55 projecting outwardly from the end side walls 56 of the firebox pit portion 15. It will be understood that water issuing from the spray nozzles 55 is projected onto the logs 30 and to this end, the spray nozzles 55 are directionally adjustable to achieve an optimum setting. It will be clear that the logs 30 can also be spot quenched manually by simply spraying the logs 30 with an external, auxiliary hand hose (not shown) manipulated by an operator.

The electrical circuitry for automatic and semi-automatic operation of the quenching system which incorporates the spray nozzles 55 mounted within the firebox 10 is indicated in FIG. 5.

The circuitry for providing automatic quenching includes a controller 62 incorporating a single pole, single throw, normally open relay 63, which is actuated by means of a flame sensing element 60. Relay 63 is wired in series with a single pole, single throw, normally open relay 64 having one-half to (30) seconds delay on pull-in and it will be assumed by way of example that the delay is set at (5) seconds. Relays 63 and 64 are wired in series with a solenoid 67, which actuates a normally closed water valve 70 controlling flow to the spray nozzles 55. A power source, generally indicated by numeral 71, supplied electrical energy to the circuit.

When the heat generated by a grease flame-up is sufficiently intense to be sensed by the flame sensing element 60, the relay 63 closes and remains closed as long as the heat applied to the flame sensing element 60 is maintained. If the heat intensity is maintained for more than (5) seconds, the time delay relay 64 will automatically close. When both relays 63 and 64 are closed, the solenoid 67 will be energized resulting in the opening of the water valve 70 and the supply of quenching water to the spray nozzles 55. This supply will be cut off immediately the heat intensity falls sufficiently to open relay 63. Relay 63 will not close again, and the water valve 70 will not open again until the generation of heat is sufficiently intense and the intensity is maintained for more than (5) seconds. Thus, the quenching system responds only to flame-ups of a predetermined intensity which last for a predetermined duration. The intensity is governed by the setting of the flame sensing element 60 and the duration of the delay is governed by the setting of the time delay relay 64.

The circuitry for semi-automatic quenching is provided by a single pole, single throw, normally open push button switch 72 which is wired in series with the solenoid 67. In effect, the switch 72 provides a by-pass circuit for relays 63 and 64. When the switch 72 is actuated, the solenoid 67 is energized and the water valve 70 is opened regardless of whether the heat intensity is sufficient to cause a response in the flame detector element 60. No time delay is involved in semi-automatic quenching.

It is thought that the structural features and functional advantages of this barbecue pit have become fully apparent from the foregoing description of parts, but for completeness of disclosure, the operation of the device will be briefly summarized.

The insulation provided for the firebox 10 and the provision of glass sliding doors 23 for the access opening 22 ensure that heat loss from within the firebox 10 is minimized. Products to be cooked, such as hamburgers 19 or the like may be placed on the cooking shelf 21. This shelf 21 is located directly above the primary and secondary heat sources provided by the gas burner tubes 33 and the logs 30 respectively. The gas burner tubes 33 are lighted when desired by means of the pilot supply tubes 41 at each end thereof and are controlled thermostatically by thermostats 57. The gas burner tubes 33 are disposed below the log grates 26 and are placed sufficiently close to the logs 30 thereon to ensure continuous smoldering of the logs 30, thereby producing the flavored smoke, characteristic of such logs as hickory. The primary heat source provided by the gas burner tubes 33 is substantially even and easily controlled thermostatically. However from time to time, the cooking of products containing grease results in the dripping of the grease onto the logs 30 resulting in local flame-ups. Spot quenching may be achieved by means of a hand hose if desired but is preferably achieved either automatically or semi-automatically. Automatic control is achieved by the provision of flame sensing elements 60 which, by virtue of a system of electrical relays, actuate opposed spray nozzles 55 whereby to quench excessive flaming. The circuitry includes an on-the-job adjustable time delay relay 64 which ensures that the quenching system will not be actuated automatically unless the flame-up is of significant proportions. Alternatively, semi-automatic operation of the spray nozzles may be achieved by depressing the push buttom 72, which by-passes the relay system actuated by the flame sensing element 60, and produces a quenching spray for as long as may be desired.

The provision of guards 44 and 45 respectively over the gas burners and pilot burners protects these units from grease dripping and likewise the provision of guards 61 prevents fat drippings from contacting the flame sensing elements 60.

I claim as my invention:

1. A barbecue pit comprising:
   a. a firebox including a pit portion,
   b. a cooking shelf disposed above the pit portion,
   c. smoke flavoring solids disposed within the pit portion,
   d. support means carrying said solids,
   e. gas burner means disposed adjacent the support means in ignition proximity to the smoke flavoring solids, and
   f. flame quenching means controlling the heat generated within the firebox including a flame sensitive element disposed within the firebox between the cooking shelf and the support means carrying said solids.

2. A barbecue pit as defined in claim 1, in which:
   g. guard means disposed above the flame sensitive element provide a drip shield for said flame sensitive element.

3. A barbecue pit comprising:
   a. a firebox including a pit portion,
   b. a cooking shelf disposed above the pit portion,
   c. smoke flavoring solids disposed within the pit portion,
   d. support means carrying said solids,
   e. gas burner means disposed adjacent the support means in ignition proximity to the smoke flavoring solids,
   f. flame quenching means controlling the heat generated within the firebox,
   g. the gas burner means including an elongate gas burner tube providing a plurality of side openings and having bracket means attached thereto,
   h. a guard plate mounted to the bracket means and disposed above the gas burner tube in overlapping relation to the side openings to provide a drip shield for said openings.

4. A barbecue pit as defined in claim 3, in which:
   i. the gas burner means includes an elongate gas burner tube having oppositely disposed rows of side openings, the bracket means includes spaced brackets attached to the tube, and
   j. the guard plate is removably mounted to the spaced brackets and includes opposed sloping faces said plate being disposed above the gas burner tube in overlapping relation to said rows of side openings to provide a drip shield for said openings.

5. A barbecue pit comprising:
   a. a firebox including a pit portion and a base,
   b. a cooking shelf disposed above the pit portion,
   c. smoke flavoring logs disposed within the pit portion and providing a secondary heat source,
   d. a pair of log grates disposed in side-by-side relation and adapted to carry said logs,
   e. a pair of elongate thermostatically controlled gas burner tubes disposed below associated log grates in ignition proximity to the smoke flavoring logs and providing a primary heat source,
   f. flame quenching means controlling the heat generated within the firebox and including sensing means disposed below the shelf and responsive to flame-up from said logs.

6. A barbecue pit as defined in claim 5, in which:
   g. the flame quenching means includes:
      1. spray means disposed within the fire-box between the cooking shelf and the grate,
      2. a flame sensitive element disposed within the firebox between the cooking shelf and the grates, and
      3. a solenoid water valve actuated by the flame sensitive element.

7. A barbecue pit comprising:
   a. a firebox including a pit portion and a base,
   b. a cooking shelf disposed above the pit portion,
   c. smoke flavoring logs disposed within the pit portion,
   d. a pair of log grates disposed in side-by-side relation and adapted to carry said logs,
   e. a pair of elongate gas burner tubes disposed below associated log grates in ignition proximity to the smoke flavoring logs, each gas burner tube including:
      1. a plurality of rows of side openings, and
      2. a plurality of support brackets disposed in spaced relation along the length of the pipe,
   f. guard means including a pair of elongate guard plates removably mounted to said support brackets in overlapping relation to the rows of side openings to provide a drip shield for said side openings, and
   g. flame quenching means controlling the heat generated within the firebox.

8. A barbecue pit comprising:

a. a firebox including a pit portion and a base,
b. a cooking shelf disposed above the pit portion,
c. smoke flavoring logs disposed within the pit portion,
d. a pair of log grates disposed in side-by-side relation and adapted to carry said logs,
e. a pair of elongate gas burner tubes disposed below associated log grates in ignition proximity to the smoke flavoring logs, and
f. flame quenching means controlling the heat generated within the firebox, the flame quenching means including:
1. spray means disposed within the firebox between the cooking shelf and the grates,
2. a flame sensitive element,
3. a solenoid water valve actuated by the flame sensitive element, and
4. a time delay relay actuated by the flame sensitive element to provide discharge from the water valve for a controlled time period.

* * * * *